United States Patent [19]

Borchert

[11] Patent Number: 4,694,892
[45] Date of Patent: Sep. 22, 1987

[54] APPARATUS FOR RETRIEVING SPHERICALLY SHAPED CLEANSING BODIES

[75] Inventor: Werner Borchert, Mulheim, Fed. Rep. of Germany

[73] Assignee: GEA Energiesystemtechnik GmbH & Co., Bochum, Fed. Rep. of Germany

[21] Appl. No.: 2,598
[22] PCT Filed: Mar. 13, 1986
[86] PCT No.: PCT/EP86/00137
 § 371 Date: Dec. 23, 1986
 § 102(e) Date: Dec. 23, 1986
[87] PCT Pub. No.: WO86/06823
 PCT Pub. Date: Nov. 20, 1986

[30] Foreign Application Priority Data

May 3, 1985 [EP] European Pat. Off. ........ 85200701.2

[51] Int. Cl.⁴ .............................................. F28G 1/12
[52] U.S. Cl. ...................................... 165/95; 15/3.51; 15/104.06 A
[58] Field of Search .......... 165/95; 15/3.51, 104.06 A

[56] References Cited

U.S. PATENT DOCUMENTS

| | | | |
|---|---|---|---|
| 3,919,732 | 11/1975 | Honma et al. | 15/3.51 |
| 4,234,993 | 11/1980 | Kintner | 165/95 X |
| 4,413,673 | 11/1923 | de Margret | 165/95 |
| 4,566,533 | 1/1986 | Bochinski et al. | 165/95 |

Primary Examiner—Albert W. Davis, Jr.
Assistant Examiner—Peggy Neils
Attorney, Agent, or Firm—Townsend & Townsend

[57] ABSTRACT

A retrieval device (6) is disclosed for retrieving spherically shaped cleansing bodies cyclically circulated through the cooling system of a tubular heat exchanger (2). The device has a cylindrical housing (8) subdivided into two chambers (12,13) by a filter plate (11). The end (21) of a drain tube (14) reaches into a chamber (12), while ends (19,20) of a feed tube (5), a discharge tube (7) and a rinse tube (17), respectively, into a second chamber (13). Two exteriorly driven shafts (23,24) are centrally mounted in the housing (8) and each has adjustable valve plates (32,34 and 33,35) mounted to seal against the upper and lower tube ends (19,21 and 20,22). The device (6) has three operating modes which are set by rotating the shafts to only two operational positions. In the discharging mode only the two lower tube ends (20,22) are opened and the cleansing bodies are flushed from the lower chamber (13) into the cooling water conduit (1); in the retrieval mode, only the upper tube ends (19,21) are opened, and bodies are trapped in the lower chamber (13) while water continues to flow through filter plate (11) into upper chamber (2), from where it is discharged; in the inspection mode all four tube ends (19,22) are closed, permitting the contents of the device to be inspected.

8 Claims, 3 Drawing Figures

APPARATUS FOR RETRIEVING SPHERICALLY SHAPED CLEANSING BODIES

BACKGROUND OF THE INVENTION

The invention relates to a device for retrieving foam rubber, spherically shaped cleansing bodies, which are circulated discontinuously through the cooling system of a tubular heat exchanger or the like. The device includes a cylindrical housing divided into two chambers by a sieve, and it has feed, discharge, drain and flushing tubes and valves for opening and closing the tubes.

It is conventional to clean the pipes of a water-cooled, tubular heat exchanger with spherically shaped cleansing bodies. They are made of foam rubber, or a similar material, have a diameter slightly larger than the inner diameter of the pipes, are pumped into the cooling water, and are subsequently forced through the pipes. After the cleansing bodies have passed the heat exchanger, they are retrieved from the cooling water by means of a filtration device and reintroduced into cooling water which flows toward the heat exchanger. Due to friction the cleansing bodies are subject to wear and abrasion. As their diameter decreases they must be removed from circulation and replaced.

German patent publication No. 12 38 939 accomplishes this by incorporating an interceptor apparatus in the system. Such an interceptor has a cylindrical housing divided by a cylindrical filter sieve into an inner, cylindrical chamber, connected to feed and discharge tubes, and an outer annular chamber, connected to drain and flushing tubes. The tubes extend from the chamber in a radial direction and a valve is attached to each tube. The valves can be set to allow the cleansing bodies to flow through the opened feed tube into the inner cylindrical chamber, where they are retained by the filter sieve. The water carrying the cleansing bodies flows through the sieve into the annular chamber and is discharged through the opened drain tube. When the cleansing bodies retained by the sieve are to be recirculated into the cooling system, the discharge and flushing tube valves are opened. This directs flushing water into the annular chamber and forces the cleansing bodies from the inner chamber and into the discharge tube. When all four valves are closed the cylindrical housing can be opened up, and the cleansing bodies trapped in the sieve can be removed, sorted and those with excessively reduced diameters are replaced. This requires four valve which must be controlled and operated to regulate the water flow so that water can pass through, or cleansing bodies can be retrieved and inspected. This requires generally, complex, costly electronic controls and a corresponding number of actuating motors. Additionally, the typically used ball valves wear out quickly and thereby lose their seal.

The arrangement disclosed in German Pat. No. 32 18 386 employs chambers formed in a cylindrical housing by several partitions which are rotatable about the housing axis. The chambers are subdivided into two chamber groups by a filter plate positioned perpendicular to the partitions and the housing axis. One of the two chamber groups retrieves the cleansing bodies. Each chamber group is fitted with feed and discharge tubes attached to the ends of the housing. The chambers are alternatingly rotated to communicate with the tubes leading to and from the tubular heat exchanger. Such a construction is complex and the rotating chambers result in frequent breakdowns. To prevent a short circuiting of the water in the retrieval apparatus several chamber groups are required.

It is also known to mount a box-like housing with associated valves in the feed and discharge tubes of surface condensers or surface heat exchangers. Swiss patent 462 566 discloses to provide a control shaft having two valve plates or disks each of which cooperates with a valve seat on such a box-like housing. By coupling two or more pairs of valve plates it is possible to alternately connect two or more distribution tubes with a feed tube. However, such valve plates are unsuited for retrieving spherically shaped cleansing bodies.

SUMMARY OF THE INVENTION

An object of the present invention is therefore to provide a retrieval device of the present kind having feed and discharge tubes, which can be operated and controlled to open and close in a more simple manner, and in which a more effective sealing of the valves is achieved.

This objective is realized in accordance with the present invention by subdividing the housing with a circular filter sieve which is oriented perpendicular to the longitudinal axis of the housing. A drain tube with an associated extension reaches into one chamber, and feed, discharge and flushing tubes each with an associated extension, reach into a second chamber. Further, two exteriorly driven shafts are mounted to the housing and each has valve plates which can be closed against the ends of the two upper and two lower tube extensions.

The advantage of the present embodiment is that only two control devices are needed for opening and closing the feed and discharge tubes. This significantly reduces the costs of the hardware and of the electrical controls. The valve plates or disks are positioned at right angles to the tube openings which eliminates sliding motion during closure and thereby establishes a particularly effective seal. The three operational modes of the retrieval apparatus are determined by only two operative positions of the central shaft. In the retrieval mode both upper tube extensions are open. This allows the cleansing bodies to pass through the feed tube into the lower chamber and since the lower tube extensions are closed, the bodies are trapped therein. The water continues to flow through the filter sieve into the upper chamber and is discharged through the drain tube. In the inspection mode all four tube extensions are closed. This allows the contents of the retrieval chamber to be viewed through a monitoring tube or the like. In the cleansing mode both lower tube extensions are opened with the lower shaft, achieving a bypass in which cooling water flows through the lower retrieval chamber and flushes the cleansing bodies into the cooling water conduit. After the cleansing bodies have been flushed out, the apparatus is reset to the retrieval mode. This allows passing through the apparatus to once again trap the cleansing bodies after they have been in circulation for a predetermined period.

A particularly tight seal between the valve plates and the ends of the tubes is achieved by orienting the sealing surfaces at an angle of preferably 45° relative to the axes of the associated tube extension. The sealing surfaces of the tube extensions associated with each shaft face in the same direction. Further each valve plate is preferably mounted to a rotor arm affixed to each shaft in such a way that the valve disks securely engage the sealing surfaces of the associated tube ends when the respective shafts are in a predetermined rotational position. The upper and lower tube extensions and their associated valve plates are positioned diametrically opposite one another in the chamber and on their respective shafts. Servomotors rotationally move each shaft, and the associated valve plates, into the two operational settings.

BRIEF DESCRIPTION OF THE DRAWING

An embodiment of the invention is shown in the drawings as follows.

DESCRIPTION OF THE PREFERRED EMBODIMENTS

Figure 1:
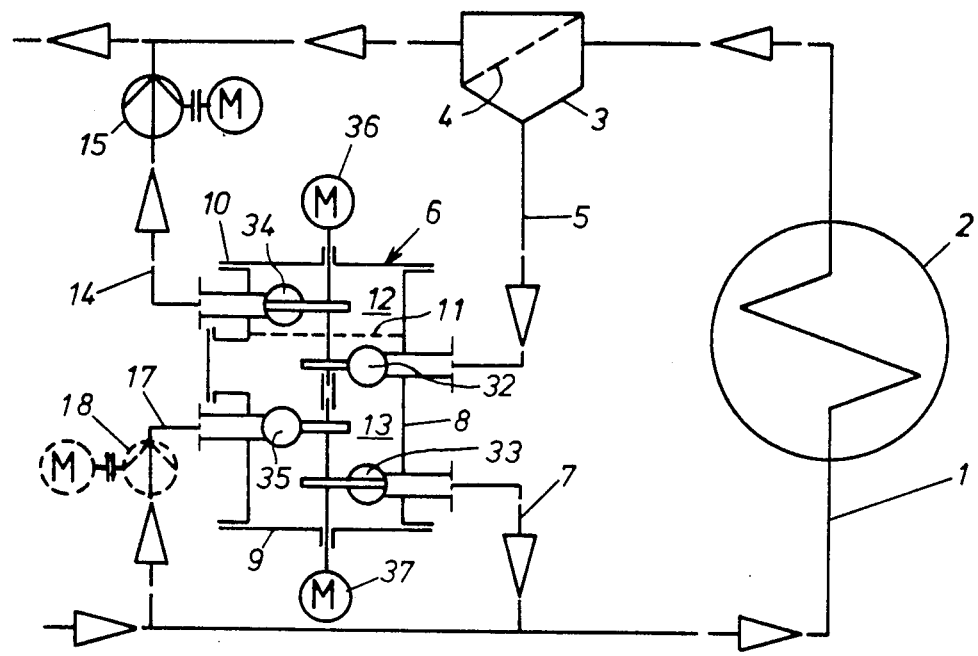
FIG. 1 schematically illustrates a system for cyclically introducing spherically shaped cleansing bodies into and retrieving them from the water cooling system of a tubular heat exchanger.

As shown in FIG. 1 cooling water is pumped by way of a cooling conduit 1 comprised of cooling pipes through a tubular heat exchanger 2. To clean the pipes of heat exchanger 2, flexibly elastic, spherically shaped cleansing bodies, made of rubber or plastic and having a diameter somewhat larger than the inner diameter of the cooling pipes, are pumped into the cooling water at timed intervals and forced though the pipes. After leaving heat exchanger 2 the cleansing bodies are removed from the main flow of cooling water by a filter 3 and cyclically recirculated to the main cooling water flow via a piping system. Cleansing bodies removed from the cooling water by a sieve 4 of filter 3, together with a minor amount of water, are fed through a feed tube 5 to a retrieval device 6. There they are entrained, stored and then intermittently reintroduced after a predetermined interval into the cooling conduit 1.

Retrieval device 6 comprises a cylindrical housing 8 with a bottom plate 9 and a cover 10. A filter plate 11 divides it into a somewhat smaller upper chamber 12 and somewhat larger lower chamber 13. Connected to upper chamber 12 is a drain tube 14 equipped with a pump 15, while feed tube 5 and a flushing tube 17, optionally equipped with an auxiliary pump 18 extend into lower chamber 13. In addition, lower chamber 13 has a discharge tube 7 which communicates with the main flow of the cooling water.

Figure 2:
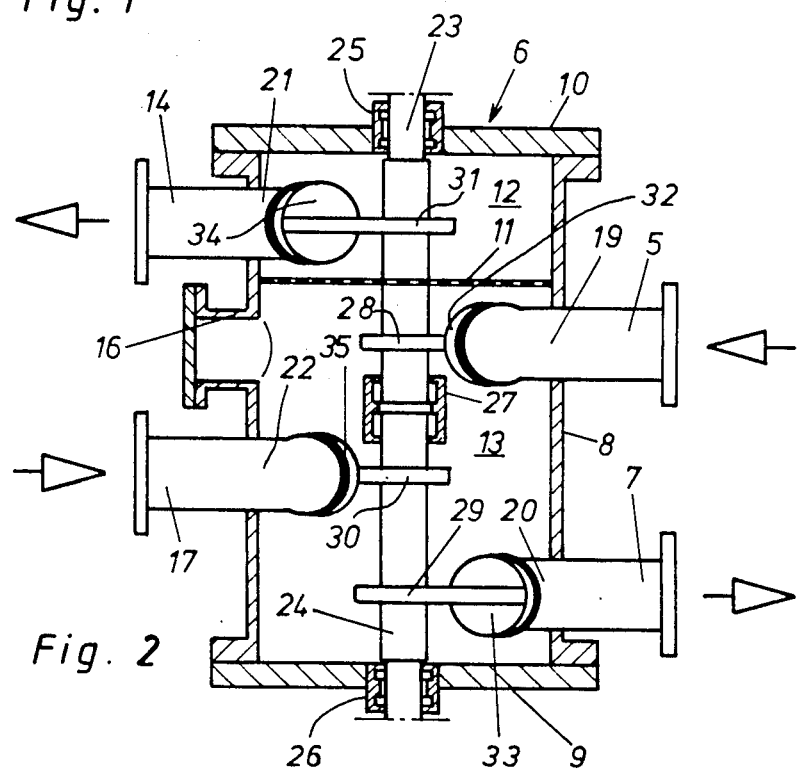
FIG. 2 is an enlarged, longitudinal view, in cross section, of the retrieval device which forms part of the system of FIG. 1.
Figure 3:
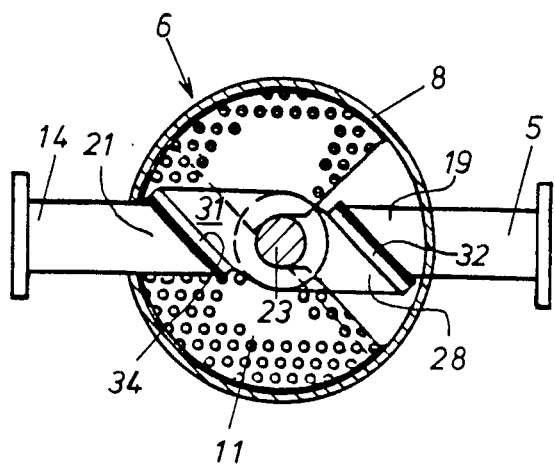
FIG. 3 is a cross section of the apparatus of FIG. 2.

Referring to FIGS. 2 and 3, an extension 21 of drain tube 14 protrudes radially into upper chamber 12. Feed tube 5, discharge tube 7 and flushing tube 17 include extensions 19,20 and 21, respectively, which protrude radially into lower chamber 13. Further, two shafts 23,24 are rotatably mounted in the center of cylindrical housing 8. A bearing 25 mounts upper shaft 23 to a cover 10, while a bearing 26 mounts lower shaft 24 to bottom plate 9. Both shafts are further rotatably supported by a journal bearing 27.

Valve plates 32,34 are mounted to upper shaft 23 by rotary arms 28,31. Each valve plate forms a tight seal against sealing surfaces on tube extensions 19,21 which are angularly inclined by 45°, as shown in FIG. 3. The valve plates 32,34 and/or the sealing surfaces on extensions 19,21 include suitable gaskets or seals. Upper shaft 23 is in the closed position when it is fully rotated counterclockwise to the right. Similarly, two valve plates 33,35 are mounted to rotary arms 29,30 on lower shaft 24. They seat on correspondingly angularly inclined sealing surfaces on tube extensions 20,22. The openings of tube extensions 19,21 and 20,22 cooperate with shafts 23 and 24, respectively, face in the same direction of rotation. In the present embodiment the openings on extensions 19,21 face in a counterclockwise direction while the openings on corresponding extensions 20,22 face in a clockwise direction. Upper and lower shafts 23 and 24 are rotated independently of one another with servomotors 36 and 37, respectively.

To trap and collect cleansing bodies in the retrieval device 6 by means of filter device 3, upper shaft 23 is rotated to the left, thereby opening extension 19 on feed tube 5 and extension 21 on drain tube 14. Simultaneously, lower shaft 24 is rotated to close the openings of extension 20 on discharge tube 7 and extension 22 on flushing tube 17. A pump 15 draws the cleansing bodies entrained in a flow of the cooling water though feed tube 5 into lower chamber 13 and where they are trapped while the water which transported the cleansing bodies flows through filter plate 11 into upper chamber 12. From there the water enters drain tube 14 and, in the present embodiment, is pumped back into the main flow. Alternatively, the water can be discharged.

When all cleansing bodies have been retrieved upper tube extensions 19,21 are closed while lower extensions 20,22 remain closed. With all tube extensions 19–22 are closed, a monitoring tube may be opened to inspect the cleansing bodies. Depending upon the setting of a control program the cleansing bodies are stored in the retrieval device for a predetermined period before they are reintroduced into the main flow of cooling water. This is accomplished by activating lower shaft 24 to open extension 20 of discharge tube 7 and extension 22 of flushing tube 17. Due to the pressure gradient in cooling conduit 1 some cooling water flows through flushing tube 17 and directs the cleansing bodies out of lower chamber 13 through discharge tube 7 and into cooling conduit 1. An auxiliary pump is provided, in case of an insufficient pressure differential within cooling conduit 1 between the points where flushing tube 17 and discharge tube 7 are connected to the cooling conduit. Pump 18, like pump 15 in drain tube 14, conveys only water and no cleansing bodies. When the cleansing bodies are flushed out of lower chamber 13, lower tube extensions 20,21 are closed, while upper extensions 19,20 are opened to trap once again cleansing bodies passing through the device after a predetermined period of circulation. The operational modes of retrieval device 6, which include the retrieval, inspection and discharging water, are cyclically or intermittently repeated in predetermined intervals as determined by the programmed control unit.

What is claimed is:

1. Apparatus for retrieving generally spherically shaped cleansing bodies circulating with cooling water in a flow circuit including a tubular heat exchanger, the apparatus comprising a generally cylindrical housing, a generally circular filter plate coaxially disposed in the housing and dividing the housing into first and second chambers, a drain tube having an end extending generally radially into one of the chambers, an end of a feed tube, an end of a discharge tube, and an end of a flushing tube, respectively, extending generally into the second chamber, the tube ends defining first and second, relatively upper tubes and first and second, relatively lower tubes extending into the housing, first and second, exteriorly driven shafts axially disposed in the housing, each shaft having first and second valve plates mounted to sealingly engage the first and second upper tube ends and the first and second lower tube ends, respectively.

2. Apparatus according to claim 1 wherein the tube ends define sealing surfaces interiorly of the housing which are inclined by about 45° relative to the longitudinal axes of the respective tubes, the tube ends cooperating with the valve plates on a given shaft facing in the same direction of shaft rotation.

3. Apparatus according to claim 1 including a rotor arm for each valve plate attached to the corresponding shaft and positioning the plates for forming a tight seal with the sealing surfaces of the tube ends when the shafts are in predetermined rotational positions.

4. Apparatus according to claim 1 wherein the first and second relatively upper tube ends and the first and second relatively lower tube ends and the corresponding valve plates are mounted diametrically opposite from one another in the housing and on the shafts, respectively.

5. Apparatus according to claim 1 including a servo motor for each shaft.

6. Apparatus for retrieving generally spherically shaped cleansing bodies circulating with cooling water in a flow circuit including a tubular heat exchanger, the apparatus comprising a tubular housing having a longitudinal axis, a sieve plate disposed transversely to the housing axis and spaced from axial ends of the housing so as to form a relatively smaller chamber and a relatively larger chamber in the housing, a drain tube extending generally radially into the smaller chamber and defining a sealing surface at an end thereof, a feed tube, a discharge tube, and a flushing tube each extending generally radially into the larger chamber, each defining a sealing surface at an inner end of the respective tube, first and second, independently rotatable shaft means axially extending into the housing, valve plates mounted to the first shaft means for rotation therewith and positioned to sealingly engage the sealing surfaces of the drain tube and the feed tube when positioned thereagainst, valve plates mounted to the second shaft means for rotation therewith and positioned to sealingly engage the sealing surfaces of the discharge tube and the flushing tube when positioned there against, and means for independently rotating the first and second shaft means from an exterior of the housing.

7. Apparatus according to claim 6 wherein the first and second shaft means are in mutual alignment and extend from respective axial ends of the housing towards a center portion thereof.

8. Apparatus according to claim 6 wherein the sealing surfaces of the tube ends are angularly inclined relative to the corresponding axes of the tubes by an angle other than 90°, and further including mounting means for the valve plates attaching the valve plates to the respective shaft means and positioning the valve plates so that they are parallel to the seating surfaces when in contact therewith.

* * * * *